United States Patent [19]
Tachizono et al.

[11] Patent Number: 5,512,215
[45] Date of Patent: Apr. 30, 1996

[54] SHADING FILM FOR COLOR FILTER AND COATING FOR FORMING SHADING FILM

[75] Inventors: Shinichi Tachizono, Chiba; Hironobu Chiyoda, Kokubunji; Toshiya Yamamoto, Matsudo; Shigeo Takashima, Chiba; Masayoshi Tsuboi, Tokyo; Hiroshi Yamane, Tokyo; Shigeo Kotera, Tokyo; Minoru Aoki, Tokushima, all of Japan

[73] Assignee: Hitachi Powdered Metals Co., Ltd., Japan

[21] Appl. No.: 199,265

[22] PCT Filed: Jun. 24, 1993

[86] PCT No.: PCT/JP93/00855

§ 371 Date: Jun. 9, 1994

§ 102(e) Date: Jun. 9, 1994

[87] PCT Pub. No.: WO94/00783

PCT Pub. Date: Jan. 6, 1994

[30] Foreign Application Priority Data

Jun. 26, 1992 [JP] Japan ................. 4-193354

[51] Int. Cl.$^6$ ................. G02B 5/20; B05D 5/06
[52] U.S. Cl. ................. 252/584; 252/582; 427/162; 427/164
[58] Field of Search ................. 252/582, 584; 359/885; 427/162, 164

[56] References Cited

U.S. PATENT DOCUMENTS

| | | | |
|---|---|---|---|
| 3,734,728 | 5/1973 | Kachel | 96/36.1 |
| 5,387,573 | 2/1995 | Oldfield et al. | 503/227 |

FOREIGN PATENT DOCUMENTS

| | | |
|---|---|---|
| 54-7855 | 1/1979 | Japan . |
| 60-129739 | 7/1985 | Japan . |
| 2-173622 | 7/1990 | Japan . |
| 2-274773 | 11/1990 | Japan . |
| 5-34514 | 2/1993 | Japan . |

OTHER PUBLICATIONS

Kobayashi, Syunsuke, "Color Liquid Crystal Display", *Display Technology Series*, published by Sangyo Tosho, (1992).

Gakkai, Nihon Shikisai, *Color Science Handbook*, Japanese Society of Color Science, published by Tokyo Daigaku Syuppankai, (1980).

*Primary Examiner*—Philip Tucker
*Attorney, Agent, or Firm*—Samuels, Gauthier & Stevens

[57] ABSTRACT

Disclosed are a shading film formed on a transparent substrate for forming a color filter, and a shading coating for forming the shading film. The shading film is made up of particles of a material with a layered lattice structure. The maximum diameter of the particles is 3 μm or less, with the average diameter in the 0.05 μm to 0.08 μm range, and 40 to 95 wt % of the particles have a diameter of 0.1 μm or less. The average aspect ratio of the particles is 10/1 or greater. The shading coating contains: a particulate material with a layered lattice structure and satisfying the characteristics relating to the particle size described above; and a dispersion medium for dispersing the particulate material. Water is used as the dispersion medium.

13 Claims, 1 Drawing Sheet

SHADING FILM FOR COLOR FILTER AND COATING FOR FORMING SHADING FILM

TECHNICAL FIELD

The present invention relates to a shading film for a black matrix for a color filter used in colored liquid crystal display devices, electroluminescence displays, colored fluorescent display devices, plasma display panels, operation analysis (OA) sensors, solid-state image sensors, and the like, and, to a coating for forming a shading pattern film.

BACKGROUND ART

A liquid crystal display device is provided with a color filter of a structure whereby, for example, picture elements of the colors red, green, and blue, which are three of the basic colors of light (hereinafter RGB color picture elements) are arranged systematically on a transparent substrate of a material such as glass, plastic, or the like.

The picture elements of a color filter are formed by means of a dyeing method in which a resin layer on which patterns have been formed using a photolithography method is dyed; a colored resist method whereby patterns are formed using a photolithography method on a previously colored plastic; a silver chloride photographic method for developing color in a silver chloride photograph; an electrodeposition method for forming patterns by electrophoresis of a coloring material; or an interference film method for forming patterns of a multilayered interference film. In addition, these picture elements can also be formed by methods wherein the above-mentioned methods are combined.

One criterion which can be given as for the image quality of a color filter for the above-mentioned type of liquid crystal display device is the contrast ratio. The contrast ratio is obtained by comparing the brilliance of a picture element dot onto which no beam is shone with the brilliance of a picture element dot onto which a beam is shone, and expressing the result as a ratio. The larger the contrast ratio of a picture, the better the picture quality. Another criterion is the variation in the spectral diffraction as discussed in Japanese Laid-Open Patent No.62-280806. In this case, the smaller the variation in the spectral diffraction, the better the image quality.

In order to increase the above-mentioned contrast ratio for the color filter, a method is known whereby a shading pattern film (black matrix) 2 is formed on the part of the picture on which no picture elements are formed, specifically, on the periphery of each of a plurality of picture elements 3 on a substrate 1, so that leakage of light is prevented, and the brilliance is reduced when no beam is shone on a picture element dot, as shown in FIG. 1.

For this type of shading pattern film, a thin film is formed on a substrate by means of a vapor deposition method, sputtering, or an ion plating method, using a metal such as chromium, aluminum, tantalum, or the like, or using a metallic oxide of copper oxide or the like. Then, the thin film is formed into the pattern film by selective removal in accordance with a photo-etching method. Or, the thin film is formed by an application in accordance with a photolithography method, a printing method, an electrodeposition method, or the like, using a coating which is a mixture of a black dye or pigment with a resin. The performance of the black matrix is evaluated by means of the reflection and shading characteristics and the like of the shading film. The shading characteristics can be illustrated by means of the optical density (extinction) value. An optical density=1 means that 10% of the incident light is passed through; an optical density=2 means that 1% of the incident light is passed through; and an optical density=3 means that 0.1% of the incident light is passed through. Specifically, the larger the numerical value of the optical density, the better the shading characteristics.

Of the conventional methods of forming the black matrix described above, in the method whereby a thin film is formed on a substrate by means of a vapor deposition method, sputtering, or an ion plating method, using a metal or a metallic oxide and then etched, a substrate for the color filter is placed in a vacuum system. For this reason, the throughput and operability are poor, and costly production equipment is required. Accordingly, it is difficult to obtain a low cost black matrix. In addition, when chromium, aluminum, tantalum, copper oxide, and the like are applied by a metal vapor deposition method, it is possible to obtain a thin film, but there is the drawback that there is considerable reflection from the transparent substrate side of the resulting thin film.

On the other hand, when a resist with light curing characteristics is used in which a black pigment such as carbon black or the like is dispersed, to fabricate the black matrix using the photolithography method (see Japanese Laid-Open Patent No. 63-298304), a thick film is required in order to increase the optical density (extinction). For example, a film thickness of 1.3 to 1.5 μm is necessary to obtain the required optical density of 2.2 as a shading pattern for an STN (super twisted nematic) liquid crystal display device. Also, many such resists normally are composed of materials dissolved in organic solvents, and these are inconvenient to handle in a working environment from the aspect of safety, health, and the like.

In addition, when a black matrix is fabricated by a printing method using printing ink in which a black pigment such as carbon black or the like is dispersed in a resin (see Japanese Laid-Open Patent No. 62-153902), the sharpness of the edge of the resulting shading pattern film is poor and the surface is rough. In addition to this, a film thickness of about 1.5 μm is required in order to obtain an optical density of 2.2.

From the above-mentioned conditions, conventionally, a production method by which the black matrix is attached to a substrate using vacuum vapor deposition of a metal or metal oxide, sputtering, or an ion plating method has been adopted for a black matrix for a color filter used with a thin-film transistor (TFT) liquid crystal display device for which an optical density of 3.0 or more, preferably 3.5 or more, is required. A method by which a shading pattern film is formed from resin in which carbon black or two or more types of pigment are dispersed by means of a printing methods or a photolithography method is not used in practice because a thick coated film results.

A shading pattern film for a color filter for a television picture tube has conventionally been fabricated from graphite, as disclosed in Japanese Laid-Open Patent Nos. 49-32926 and 53-18381.

However, in forming a shading pattern film for a television picture tube, a hole of about 300 μm diameter is opened in the shading coated film, and preciseness is not required so highly as that in drawing a narrow line. In other words, the edge of the pattern film which has rather rough areas and areas of reduced sharpness are acceptable. Therefore, although a conventional shading pattern made of graphite can be used for a television picture tube, it is not suitable for the severe conditions required by the high detail, high sharpness in a liquid crystal display device, a solid-state image sensor, an OA sensor, and the like.

DISCLOSURE OF INVENTION

The present invention has been accomplished with due consideration to the above-mentioned conditions, and an object of the present invention is to provide a shading pattern of a high optical density with a thin-film of a thickness of 1 µm or less, and preferably 0.5 µm or less, and to provide a coating for forming this type of pattern film.

To achieve the object of the present invention, the inventors, as the accumulated results of painstaking research, have discovered that a shading pattern with a high optical density is obtained by using particles of a material with a specified crystal lattice structure to form a shading pattern, and have thus perfected the coating for forming the pattern film of the present invention.

The shading film according to the present invention is a shading film formed on a transparent substrate to form a color filter, comprising particles of a material with a layered lattice structure, in which the maximum diameter of said particles is not more than 3 µm, an average diameter of the particles is within the range of 0.05 µm to 0.08 µm, and 40 wt % to 95 wt % of the particles have a diameter of not more than 0.1 µm, and the average aspect ratio of the particles is not smaller than 10/1.

Moreover, the shading coating according to the present invention is a shading coating comprising: a particulate material of a matter with a layered lattice structure, in which the maximum diameter of said particulate material is not more than 3 µm, the average diameter of the particulate material is within the range of 0.05 µm to 0.08 µm, and 40 to 95 wt % of the particulate material have a diameter of not more than 0.1 µm, and the average aspect ratio of the particulate material is not smaller than 10/1; and a dispersion medium for dispersing the particulate material.

This coating is applied to a surface to be formed with a shading film, and the dispersion medium is removed from the coating, whereby the shading film is formed.

BEST MODE FOR CARRYING OUT THE INVENTION

Figure 1:
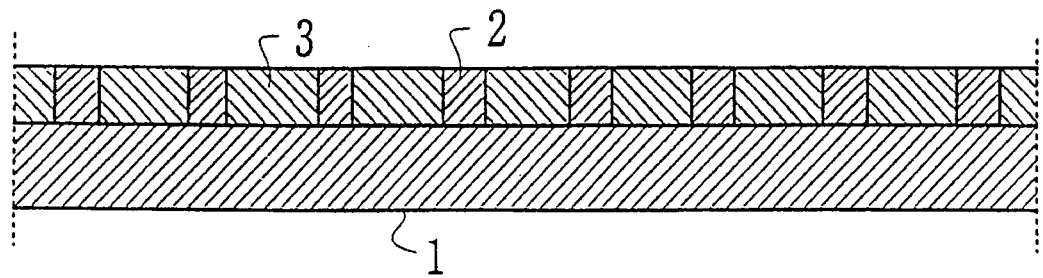
FIG. 1 is a sectional view showing the structure of a color filter.

A detailed explanation of the present invention will now be given.

The inventors of the present invention have conducted investigations into film forming materials which exhibit a high optical density even when the film is thin. As a result of these investigations, the inventors have discovered that, when a film is formed from particles of a material with a layered lattice structure, a thin-film shading pattern with a high optical density is obtained. When this material with a layered lattice structure is pulverized, the particles have a thin leaf-like shape. If these particles of the material with a layered lattice structure are formed into a film, these particles overlap and become laminated, lining up almost parallel with the coating surface. By means of this structure, it is possible to effectively shade the light even when the resulting shading film is thin. In particular, when the thin, leaf-like particles are minute particles of less than a specified dimension, it is possible to form a thin, very fine coated film with excellent adhesion to a transparent substrate. Specifically, the shading film of the present invention is formed in a pattern by means of thin, leaf-shaped particles of the material with the layered lattice structure. A shading coating is used in forming the shading film wherein the thin, leaf-shaped particles of the material with the layered lattice structure are dispersed in a dispersion medium, and a film is formed in accordance with a forming method for a shading pattern including a process by which the coating is applied to the substrate and dried.

Examples of a material with a layered lattice structure for forming the above-mentioned shading pattern which can be given include graphite, molybdenum disulfide, tungsten disulfide, boron nitride, fluorinated graphite, selenium sulfide, mica, talc, enstatite and the like. It is possible to use these materials individually or to adopt a combination of two or more. These layered lattice structured materials can be used combined with dyes or pigments. Use of the dyes or pigments enables to tone the shading pattern film.

When an above-mentioned layered lattice structured material is pulverized using a pulverizing mill such as a ball mill, a roll mill, a sand mill, or the like, the layer structured material peels away between the layers to form thin leaf-shaped particles. In the thin leaf-shaped particles of the present invention, it is preferable that the particle size distribution and the aspect ratio (the ratio between the particle thickness and the width dimension) satisfy the conditions explained below. Here, it is noted that the following discussion is based on a particle size and particle size distribution measured using a light transmission particle size distribution measurement device (reference: Japanese Industrial Standard A1204). The particle size in this measurement is represented by a particle diameter corresponding to the Stokes diameter. The aspect ratio is calculated from the average diameter and the thickness of the flat part of the particle measured from an electron microscope photograph of the particle. The aspect ratios of a predetermined number of particles are averaged to obtain the average aspect ratio of the particle material.

The above-mentioned thin, leaf-shaped particles of the material with the layered lattice structure preferably has a maximum particle diameter of 3 µm or less. If the particle diameter is greater than 3 µm, the coated film is not formed uniformly and the pattern shape of the shading film is not formed correctly, which is undesirable. In addition, it is preferable to have minute particles for which the diameter of most of the particles is 0.1 µm or less. If the ratio of the particles with a diameter of 0.1 µm or less is less than 40% by weight, the adhesion of the shading film to the substrate is weak. However, in order to make the percentage of particles with a particle diameter of 0.1 µm or less greater than 95 wt %, a drop in productivity cannot be avoided in the production of the thin leaf-shaped particles, and this is not economically desirable.

In addition, the average particle diameter (weight average) of the above-mentioned particles is ideally in the 0.05 to 0.08 µm range. If the average particle diameter is larger than this range, the shape of the coated film is non-uniform, and an incorrect shape is obtained for the pattern of the shading film. However, when the average particle diameter is smaller than the above-mentioned range, the productivity of the thin leaf-shaped particles drops, therefore this is not desirable economically.

Further, the above-mentioned particles are preferably thin, leaf-shaped particles with an average aspect ratio of 10/1 or greater. If this value is less than 10/1, it is not possible to obtain a high optical density in the formed film. An aspect ratio of greater than 10/1 means that the length of the long side of the thin leaf-shaped particle is 10 times or more the length of the short side. In this thin leaf-shaped particle, the long side corresponds to the average diameter of the particle in the above-mentioned electron microscope photograph, and the short side corresponds to the thickness of the particle.

As outlined above, when the particle is large, the coated film is non-uniform, and when the particle is not a thin leaf-shaped particle, it is necessary to provide a thick film to obtain a film with a high optical density. Accordingly, in the production of the shading coating, it is desirable to make a suitable selection in the range where a thin, leaf-shaped particle is obtained economically with good efficiency, so that, as far as possible, a minute particle with a high aspect ratio is used.

The coating is prepared by dispersing the thin, leaf-shaped particles in a dispersion medium, then the shading film is formed using this coating. When this coating is applied to a transparent substrate and dried, the particles are lined up so that the flat portions overlap on the surface of the substrate, so that a thin, minute coating is formed, with good adherence to the transparent substrate.

Water can be used as the dispersion medium for the coating. As necessity arises, an organic solvent or the like can be combined. When the dispersed liquid is prepared, water can be mixed with an appropriate amount of a dispersing agent so that the thin leaf-shaped particle is adequately dispersed in the dispersion medium. Examples of preferable dispersing agent which can be given include, for example, sodium β-naphthalenesulfonate, sodium alkyl-naphthalenesulfonate, sodium lignin sulfonate, and the like. The amount of the dispersing agent can be suitably set within a range of 0.5 to 20 wt % of the weight of the particles. The thin, leaf-shaped particles are dispersed in colloid form in the dispersion medium by using a suitable amount of the dispersion medium. If too much amount of the dispersing agent is used, the water resistance of the shading coating is poor and there is also the drawback that the coating film becomes thick, and the like.

The amount of the thin, leaf-shaped particles contained in the dispersion coating can be suitably adjusted in accordance with the coating method, the size of the transparent plate to which the coating is applied, and the optical density required for the shading pattern. However, for convenience of implementation, about 2 to 30 wt %, and preferably about 25 wt % is suitable. If the amount of the particles in the dispersion coating is too small, the coated film becomes very thin and the optical density is small. If the amount is too great, the coated film is thick, with a large variation in the thickness of the coated film.

Next, the forming method for the shading pattern film will be explained.

The substrate on which the coated film is formed is indicated by reference numeral 1 in FIG. 1. Substrates which can be used include transparent members such as a glass plate or a glass plate with a thin covering of $SiO_2$ or $SiN_x$ (silicon nitride), a plastic plate for optical use (for example, polymethylmethacrylate, polystyrene, cyclohexylmethacrylate, and the like), and resin films such as polymethylmethacrylate polyester, polybutyral, polyamide, polyimide, and the like.

For example, as in the case of a liquid crystal display device, when a color filter on which a shading pattern film is formed is integrally formed with a main unit to which the color filter is applied, a glass plate, a glass plate to which ITO (indium tin oxide) is provided in a pattern form, or a color filter element on which ITO is made into a matrix, correspond to the above-mentioned transparent substrate 1. In the case of a kind of TFT liquid crystal element, a solid-state image sensor, or a color sensor, the light receiving surface corresponds to the transparent substrate 1. An insulating layer may also be provided on the light receiving surface.

First, a photoresist is applied to the transparent substrate 1. Either a so-called positive photoresist wherein an exposed section is dissolved in a developer, or a so-called negative photoresist wherein an unexposed section is dissolved in a developer can be used as a photoresist. In addition, a photoresist acted upon by radiation energy such as ultraviolet light or near ultraviolet light, near infrared light, an electron beam, or an ion beam, or the like, can be used.

A suitable thickness for the resist film after the photoresist layer has been applied and a prebaking step carried out is 2 μm or less, and preferably 0.6 μm or less. This is important in order to uniformly apply the coating onto the photoresist pattern in a subsequent process, and, in order to improve the sharpness of the edge of the shading pattern film when the coating is lifted off by etching together with the underlying photoresist along the photoresist pattern. Normally, with a liquid crystal display element, a striped shading pattern film with a line width of 10 to 100 μm is formed, and there are cases where a line width of 3 to 8 μm is necessary as a shading pattern for an alignment mark. When a shading pattern with this type of very fine line width is required, it is normally of particular importance to use a positive resist for the photoresist pattern in order to fabricate a shading pattern with a highly precise degree of sharpness, and it is preferred to have a thin film resist.

After the coated and dried resist film is exposed via a mask, it is developed using water containing an alkali, an acid or the like, then the pattern of the photoresist is obtained by drying. The above-mentioned mask is provided with a shading film formed from a metal or an oxide of that metal, such as Cr, Ni, Mo, Ta, Zr, Ag, Cu, or the like on a transparent substrate such as a glass plate or the like.

Next, a coating of minute particles of a thin, leaf-shaped structure is applied to the transparent substrate provided with the photoresist pattern, then dried, and prebaked if necessary, to form a coated film.

The upper limit of the thickness of the leaf-shaped particle coating film is determined while taking into account the process conditions for fabricating the subsequent RGB color picture elements. For example, when using a fabrication method for printing RGB color picture elements, the thinner the coated film, the smaller the irregularities in the thickness of the printed colored picture element, and the sharper the edges of the printed colored picture element are sharp as well. Also, when the RGB color picture element is fabricated using a photofabrication method with a photoresist containing a pigment, the thinner the coating film, the easier it is to uniformly coat the pigment-containing resist onto the shading pattern film, and drawbacks such as radiating striations are few. Further, any unevenness in the thickness caused by irregularities in the surface of the colored picture elements is very slight.

Taking the above points into consideration, the application process for the coating of the thin, leaf-shaped, minute particles is regulated so that the thickness of the resulting coated film is 1 μm or less.

The lower limit of the thickness of the formed coated film is determined to correspond to the optical density required in the shading pattern film. As a result, in the case of TN (twisted nematic) or STN (super twisted nematic) liquid crystal display elements, the thickness of the coated film is set at about 0.16 μm or greater, preferably 0.2 μm or greater, and most preferably 0.25 μm or greater, because the required optical density for the shading pattern is 1.8 or greater, preferably 2.2 or greater, and most preferably 2.5 or greater. In the case of TFT (thin-film transistor) liquid crystal display elements, the optical density of the required shading pattern is 3.0 or greater, and more preferably 3.5 or greater, therefore, the thickness of the coated film is set at 0.3 μm or greater and more preferably, 0.37 μm or greater.

After the coated film is formed, it is immersed in a resist peeling liquid and sprayed with a developer, then the section without the shading pattern is peeled away together with the photoresist pattern to form the shading pattern film. The resist peeling liquid permeates the thin shading coating film to dissolve the resist pattern at the inner side of the shading coating, so that the resist pattern is peeled away from the substrate.

In the case of a negative photoresist, water, or an aqueous solution of at least one type of oxidizing agent such as hydrogen peroxide, an alkali metal salt of hypochlorous ACLU, or an alkali metal salt of iodic acid can be used as the resist peeling liquid. In the case of a positive photoresist, sodium hydroxide, potassium hydroxide, lithium hydroxide, or an alkaline aqueous solution of a so-called organic alkali such as tetraalkyl ammonium hydroxide (where the alkyl group is methyl, ethyl, isopropyl, or the like) dissolved in water is used, with the alkali concentration in the range of 0.1 to 4% by weight.

In the case where it is difficult to dissolve the positive photoresist in alkali, there are cases where the effect of applying the resist peeling liquid is produced by reexposing because this makes it easier to dissolve the positive photoresist in an alkaline aqueous solution. Or, there are also cases where a resist peeling liquid containing 1 to 20% by volume of an organic solvent such as acetone; an alcohol such as ethyl alcohol, isopropyl alcohol and the like; ethyl cellosolve; or ethyl cellosolve monoacetate is effective.

As a developer, hot water can be used for a negative photoresist and an aqueous solution of alkali can be used in the case of a positive photoresist.

The shading pattern film according to the present invention exhibits an extinction of 2.0 or greater, when the thickness of the coated film is 0.15 μm, and an extinction of 3.0 or greater when the thickness is 0.3 μm. Therefore, a thin coated film with a good shading ratio (extinction characteristic) can be formed and it is possible to eliminate any operational error caused by external or stray light. In comparison, in the case of a conventional shading film made from carbon black, a coated film of three to four times the thickness must be used to obtain the same shading ratio as the shading pattern film of the present invention.

Using an angle-changeable brilliance measurement device (model VP-1001DP) manufactured by Nippon Denshoku Kogyo K.K., when a beam of light is radiated at an angle of 45° and the light reflected from a standard black plate, a light reflection ratio of 84 is measured. When the light reflection ratio for the film is measured from the glass surface for the graphite shading film, which is included among the shading films made from the thin leaf-shaped particles according to the present invention, a light reflection ratio of 87 is obtained. In contrast, the light reflection ratio for a conventional carbon black film is 252, and for a metallic chromium vapor deposition film, 756. Accordingly, the reflection from the shading film of the present invention is extremely small.

In addition, using an optical density meter (manufactured by Tokyo Denshoku K.K., commercial name: microcolor analyzer-TC-1800M) for the graphite shading film which is included among the shading films made from the thin leaf-shaped particles of the present invention, when the lightness (Hunter L) for the diffusion reflection from the glass side surface is measured, the value is about 8. In contrast with this, the lightness for a conventional carbon black film is about 4, but the metallic chromium vapor deposition film cannot be measured because of the reflection from the metal. As a result, the shading film of the present invention can be regarded as black (low lightness) of the same degree as carbon black.

When films of various layered lattice structure materials such as graphite, molybdenum disulfide, tungsten disulfide, boron nitride, fluorinated graphite, selenium sulfide, mica, talc, enstatite, and the like are formed on image display surfaces, the respective inherent color tones of each material are exhibited so that a suitable layered lattice structure material can be selected to obtain the desired color tone.

The coating of the present invention can include a layered lattice structure material of thin, leaf-shaped minute particles in water and a small amount of a dispersing agent. However, it does not include an inorganic bonding agent such as water glass or an organic bonding agent such as synthetic resin, natural resin, or the like. Therefore, an extremely thin coated film can be obtained which exhibits good weather resistance.

In addition, since water can be used as the medium for the coating material of the present invention, there is no danger of fire in the coated film forming process. Also, there is no worry about the effect on the human body, so the coating material of the present invention is therefore hygienic and safe.

Moreover, because water can normally be used in the cleaning of the equipment and for the dilution of the coating, this is economical, and the expense relating to the solvent recovery equipment and disposal equipment necessary when using a conventional organic solvent type coating and the like, is reduced. (Examples)

Now, with reference to the examples, the present invention will be described more detail.

EXAMPLE 1

Scale-like graphite particles of a particle diameter of about 5 μm were placed in a ball mill 50% filled with balls and having a capacity of 5 liter and pulverized for 60 hours at 40 rpm.

The particle size distribution of the pulverized graphite particles was measured using a light transmission particle size distribution measurement device in accordance with Japanese Industrial Standard A1204. These measurements showed that the particle diameter was 1 μm or less, while 85% by weight of these particles had a particle diameter of 0.1 μm or less, an average particle diameter of 0.06 μm, and an average particle aspect ratio 25/1.

One part by weight of sodium β-naphthalenesulfonate was added to five parts by weight of the resulting particles, and, after thorough mixing, this material was placed in 94 parts by weight of pure water. The mixture was agitated for about three hours using a high speed agitator (manufactured by Tokushu Kika Kogyo K.K., Model: Homomixer-M) to produce a graphite coating.

Figure 2:
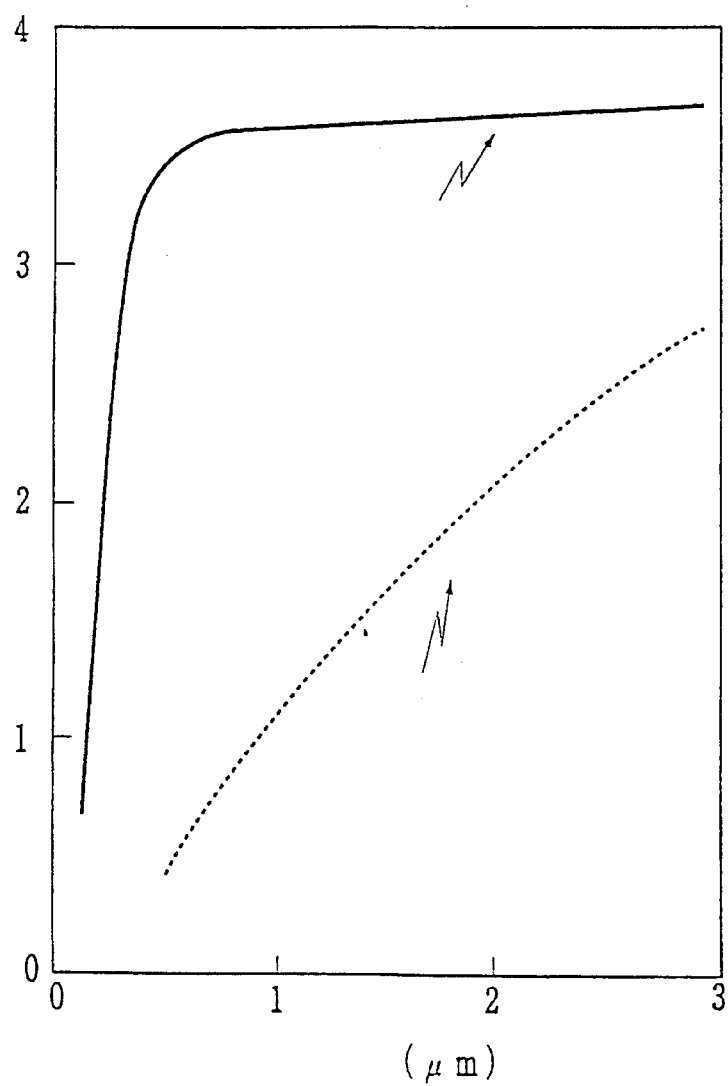
FIG. 2 is a graph showing the relationship between the film thickness of a shading film of the present invention and the optical density and between the film thickness of a carbon black film and the optical density.

The resulting coating was applied to a smooth glass plate 300 mm long, 300 mm wide, and 1 mm thick, then dried. At this time, coated films of different thicknesses were obtained by varying the speed of rotation of the coating machine in the range of 100 to 1000 rpm. The thicknesses of the coated films versus the optical density were measured for these coated films. The results are shown in FIG. 2.

Comparative Example 1

Using carbon black (particle size: maximum particle diameter 0.09 μm or less; particle diameter of 85% by weight of particles—0.06 μm or less; average particle diameter 0.04 μm; shape of particles: lumps (can be considered as almost spherical)) instead of the scale-like graphite of the first example, a coating of carbon black was produced using the same method as in the first example. The thicknesses of the coated films versus the optical density were measured for coated films using the resulting coating in the same manner as in the first example. These results are also shown in FIG. 2.

It can be seen from the results of both the first example and the first comparative example that in each case, the greater the film thickness, the greater the optical density. However, in the case of the coated films of the present invention fabricated from the graphite particles, even the thinner films exhibited a high optical density.

EXAMPLE 2

<Production of coating>

One part by weight of sodium β-naphthalenesulfonate was added to 19 parts by weight of pulverized graphite particles produced in the same manner as in the first example, and, after thorough mixing this material was placed in 80 parts by weight of pure water. The mixture was agitated for three hours using a high speed agitator (manufactured by the Tokushu Kika Kogyo K.K., Model: Homomixer-M) to produce a coating.

<Production of shading pattern film>

An alkali glass plate (1 nun thick) coated with a thin film of silicon dioxide was cleaned, then a negative resist (NON-CRON 60K, manufactured by Tokyo Ohka K.K.) was applied to this plate by a spin coater. The application was then dried to provide a resist film 0.4 μm thick on the glass.

This film was heated to a temperature of 100° C. for 90 sec on a hot plate, and then closely exposed to the light from an ultrahigh pressure mercury lamp through a positive type black matrix mask at an intensity of 8 mJ/cm², developed for 60 sec using pure water at 40° C., and dried.

The film was then coated with the above-mentioned coating using a spinner and dried for two minutes at 80° C. to obtain a coated film substantially composed of graphite layer and having a thickness of 0.23 μm.

The glass plate coated in this manner was then immersed for 91 sec at 40° C. in a 5% aqueous solution of hydrogen peroxide adjusted to a pH of 2.0.

Next, pure water was sprayed over the coated film, and the negative resist, other than the portion forming the shading matrix, and the graphite layer were removed to obtain a shading pattern film.

The optical density of the shading pattern film measured using an optical density meter (model: microcolor analyzer TC-1800M; manufactured by Nippon Denshoku Kogyo K.K.) for measurement of small portions was determined to be 2.2. Also, the shape of the edge of the picture line of the pattern film was adequate for use as a black matrix for a liquid crystal panel for STN.

EXAMPLE 3

<Production of shading pattern film>

A boron oxide glass plate (manufactured by the Corning Co., commercial name: 7059; 1 mm thick) was cleaned and dried, then after 60 seconds exposure to the vapor from HMDS (hexamethyldisilazane), this plate was coated with photoresist (manufactured by Tokyo Ohka K.K.; commercial name: OFPR-800) using a spinner, and the coating was dried, and prebaked at 90° C. for 2 minutes to form a photoresist with a film thickness of 0.2 μm.

A negative black matrix mask was overlaid on this photoresist from a gap of 30 μm and proximity exposure was implemented using an ultrahigh pressure mercury lamp at an intensity of 30 mJ/cm², followed by developing for 60 sec at 23° C. using a developer (manufactured by Tokyo Ohka K.K.; commercial name: NMD-3, density 2.8%), and drying.

The coating used in the second example was then applied using a spinner, and dried for two minutes at 80° C. so that a essential graphite layer 0.38 μm thick was obtained. This was immersed in a 2% aqueous solution of sodium hydroxide to obtain a shading pattern film.

The optical density of the shading film was measured by means of a microdensity meter and a value of 3.5 was obtained. The shape of the edge of the picture line of the shading pattern film was sharper than that of the second example. This shading film was suitable for use as a shading pattern for a liquid crystal panel for TFT.

EXAMPLE 4

With the exception of the point of using a negative type mask for a resolving power test chart (manufactured by the Toppan Printing Co., Ltd.; commercial name TOPPAN-TESTCHART-NO1-N) instead of the mask for a black matrix during exposure in the third example, a shading pattern was formed by the same method as in the third example.

An image of the above-mentioned test chart 3-3, resolving power 5 μm LPS (lines per space), was reproduced on the resulting pattern. In addition, the light reflection power of the set-solid section of the resulting image was measured at an angle of incidence of 45° giving a value of 87.

Compared with a value of 756 obtained from a chromium film 1500 Å thick, the above-noted measured result of the reflection power is seen to be low, showing that this is a superior shading film. If a shading pattern film with this type of low reflection power is applied to a solid-state image sensor, there is no unnecessary light provided to the sensor section, and also, when this shading pattern film is used on a liquid crystal display panel, the observer does not receive any undesired light.

EXAMPLE 5

<Production of coating>

Thin, leaf-shaped particles of molybdenum disulfide of a particle diameter of about 0.8 μm were placed in a ball mill 50% filled with balls and having a capacity of 5 liter and pulverized for 60 hours at 40 rpm.

The average particle diameter of the pulverized molybdenum disulfide was 0.05 µm, and 91% by weight of these particles had a particle diameter of 0.1 µm or less, while the average particle aspect ratio was 21/1.

To 17 parts by weight of the resulting particles added were 2.6 parts by weight of sodium lignin sulfonate, and, after thorough mixing, this material was placed in 80.4 parts by weight of pure water. The mixture was agitated for about three hours, using the high speed agitator, to produce a coating.

<Production of shading pattern film>

Next, using the same procedures as for the third example, a shading pattern film was formed on a boron oxide glass substrate.

The optical density of the shading matrix was measured by means of a microdensity meter and a value of 3.0 was obtained. Moreover, the shape of the edge of the picture line of the shading pattern matrix was found to be suitable for use as a shading pattern for a liquid crystal panel for TFT.

Comparative Example 2

Scale-like graphite particles of a particle diameter of about 5 µm were placed in a ball mill 50% filled with balls and having a capacity of 5 liter and pulverized for 20 hours at 40 rpm.

The particle size distribution of the pulverized graphite particles was measured using a light transmission particle size distribution measurement device in accordance with Japanese Industrial Standard A1204. These measurements showed that the maximum particle diameter of these graphite particles was 3 µm; 85% by weight of these particles had a particle diameter of 0.5 µm or less, and the average particle diameter was 0.2 µm. The average particle aspect ratio of the particles was 20/1.

A coating was produced by the same method as in the first example, using these graphite particles. A shading pattern film was formed by the same method as in the fourth example, using the coating obtained in the above manner.

An image of a test chart 1-6, resolving power 14.0 µm, was reproduced on the resulting pattern film. In addition, the lightness (Hunter L) of the set-solid section of the resulting image was measured to obtain a lightness of 18.

From the foregoing results, it can be understood that it is not possible to form a fine pattern 3 to 8 µm in width with a coarse particle. Moreover, as can be understood from the results of the lightness measurements, the smaller the particle diameter, the smaller the lightness, and thus the better the contrast.

USABILITY IN THE INDUSTRY

As explained above, because a thickness of the shading film according to the present invention necessary to obtain the desired optical density is small, the shading characteristics are superior, and further the adherence to the substrate and the weather resistance of the coated film is good, and when the film is used as a black matrix for a color liquid crystal display device, the image quality can be improved by one grade.

Moreover, because the coating for the shading pattern film of the present invention is dispersed in water and does not contain an inorganic or an organic binder, it can be easily handled and is sanitary, and can be provided at a low price.

We claim:

1. A shading film formed on a transparent substrate to form a color filter, comprising particles of a material with a layered lattice structure and having an optical density of not smaller than 1.8, in which the maximum diameter of said particles is not more than 3 µm, an average diameter of the particles is within the range of 0.05 µm to 0.08 µm, and 40 wt % to 95 wt % of the particles have a diameter of not more than 0.1 µm, and the average aspect ratio of the particles is not smaller than 10/1.

2. The shading film as claimed in claim 1, wherein said particles are leaf-like particles laminated along the surface of the shading film.

3. The shading film as claimed in claim 1, wherein said material with the layered lattice structure is selected from the group consisting of graphite, molybdenum disulfide, tungsten disulfide, boron nitride, fluorinated graphite, selenium sulfide, mica, talc and enstatite.

4. A shading coating comprising:

a nonvolatile portion having an optical density of not smaller than 1.8 and a dispersing medium for dispersing the nonvolatile portion, the nonvolatile portion comprising a particulate material of a matter with a layered lattice structure, in which the maximum diameter of said particulate material is not more than 3 µm the average diameter of the particulate material is within the range of 0.05 µm to 0.08 µm, and 40% to 95 wt % of the particulate material have a diameter of not more than 0.1 µm, and the average aspect ratio of the particulate material is not smaller than 10/1.

5. The shading coating as claimed in claim 4, wherein said matter with a layered lattice structure is selected from the group consisting of graphite, molybdenum disulfide, tungsten disulfide, boron nitride, fluorinated graphite, selenium sulfide, mica, talc and enstatite.

6. The shading coating as claimed in claim 4, wherein the dispersion medium includes water.

7. The shading coating as claimed in claim 4, further comprising a dispersing agent.

8. The shading coating as claimed in claim 7, wherein the dispersing agent is selected from a group consisting of sodium β-naphthalenesulfonate, sodium alkylnaphthalenesulfonate, and sodium lignin sulfonate.

9. The shading coating as claimed in claim 4, for use in forming a shading film for a color filter.

10. A method of forming a shading film, comprising the steps of:

applying a shading coating to a surface to be provided with a shading film; and removing the dispersion medium from the applied coating, wherein the shading coating comprises a nonvolatile portion having an optical density of not smaller than 1.8 and a dispersion medium for dispersing the nonvolatile portion, and the nonvolatile portion comprises a particulate material of a matter with a layered lattice structure, in which the maximum diameter of said particulate material is not more than 3 µm, the average diameter of the particulate material is within the range of 0.05 µm to 0.08 µm, and 40 wt % to 95 wt % of the particulate material have a diameter of not more than 0.1 µm, and the average aspect ratio of the particulate material is not smaller than 10/1.

11. A shading film formed in accordance with the shading film forming method as claimed in claim 10.

12. A shading film for a color filter, comprising particles of a material with a layered lattice structure and having an optical density of not smaller than 1.8, in which the maximum diameter of the particles is not more than 3 µm, average diameter of the particles is within the range of 0.05

μm to 0.08 μm, and 40 wt % to 95 wt % of the particles have a diameter of not more than 0.1 μm, and the average aspect ratio of the particles is not smaller than 10/1.

13. A shading film for intercepting light radiation, comprising particles of a material with a layered lattice structure and having an optical density of not smaller than 1.8, in which the maximum diameter of said particles is not more than 3 μm, an average diameter of said particles is within the range of 0.05 μm to 0.08 μm, and 40 wt % to 95 wt % of the particles have a diameter of not more than 0.1 μm, and the average aspect ratio of the particles is not smaller than 10/1.

* * * * *